Patented Oct. 5, 1943

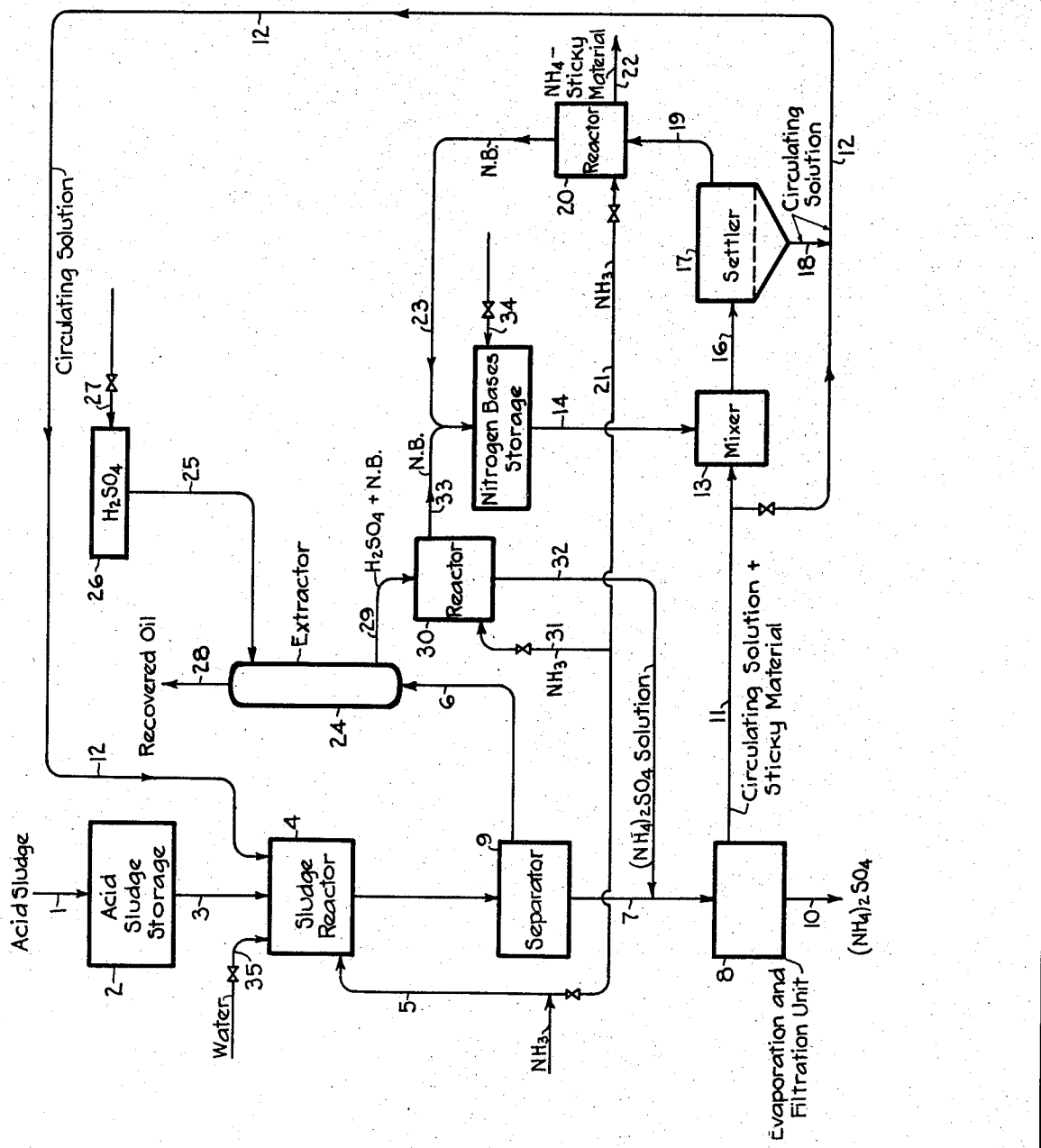

2,331,235

UNITED STATES PATENT OFFICE 2,331,235

PURIFICATION OF SALT SOLUTIONS

Jan D. Ruys, Pittsburg, Russell L. Kittle, Concord, Frank W. Heath, Pittsburg, and William H. Dietz, Concord, Calif., assignors to Shell Development Company, San Francisco, Calif., a corporation of Delaware Application January 31, 1941, Serial No. 376,812

2 Claims. (Cl. 23—119)

This invention relates to an improved process for reacting sulfuric acid with bases. More particularly, it relates to a process wherein waste sulfuric acid in sludges, such, for example, as are produced in petroleum refining, are reacted with bases to form salts which are useful in industry, as fertilizers, etc. Some examples of salts so formed are sodium sulfate, calcium sulfate, ammonium sulfate.

It is customary to dispose of waste sulfuric acids that arise from petroleum refining by converting them to useful salts by reacting with suitable bases. Unfortunately, sometimes the salts so produced have either no commercial value or else their value is seriously depreciated because they cannot be freed from a sticky material which coats the individual salt crystals, reducing their purity and at the same time making them very difficult to handle because of their tendency to cake or exhibit abnormal hygroscopic tendencies and other detrimental properties. This problem of sticky material has been especially serious since the introduction of the alkylation process in the petroleum industry. The waste from acids used as catalysts in this process is such that it is especially difficult to produce salts of commercial value because of the abnormally large amount of sticky material that is deposited upon salt crystals made from these acids.

It is an object of this invention to improve the process of neutralizing acid sludges with basic substances in such a manner that the salt produced is free from objectionable quantities of sticky material. It is a further object to remove the substances giving rise to sticky material from sulfuric acid refinery sludge. It is yet another object to recover this sticky material in a form suitable for further processing into valuable products, and it is a final object to provide a process to remove these objectionable impurities which is economical and which can be readily adapted to existing plants for the production of salts from waste acid sludges and bases.

The present invention comprises extracting sticky material from a solution obtained by neutralization of acid sludges by means of nitrogen bases such as petroleum nitrogen bases, quinoline, pyridine, and the like. The nitrogen bases form complexes with the sticky material, which is believed to be primarily organic sulfates. The sticky material can afterwards be liberated from the nitrogen bases, which are thus regenerated and can be employed in a cyclic process, as is more fully set forth hereinbelow. This invention may be better understood from the following figure, which is a flow diagram including the essential parts of the invention. For purposes of illustration the process will be described with reference to the production of ammonium sulfate, free from objectionable quantities of sticky material, manufactured in the process of neutralizing petroleum refinery acid sludge with ammonia.

Refinery acid sludge, usually containing amounts of nitrogen bases, is admitted through line 1 to storage tank 2, thence to reactor 4 through line 3, wherein it is contacted with ammonia admitted to reactor 4 via line 5. Ammonium sulfate circulating solution is also continuously admitted to reactor 4 through line 12. Additional water may also be supplied to reactor 4 through line 35, if necessary, in order to prevent over-saturation or over-heating of the salt solution formed therein. The salt solution, including oily and tarry materials separated as the result of the ammonia-acid sludge reaction, passes into a separator 9 wherein the two phases separate, an upper oil phase which includes any nitrogen bases present in the acid sludge introduced in reactor 4, and a lower aqueous ammonium sulfate solution. The oil layer is withdrawn and may be further treated to liberate any nitrogen bases present, as will be described below, the salt solution being passed through line 7 to an evaporation and filtration unit 8.

In evaporation and filtration unit 8 a portion of the salt solution is passed without further treatment into line 11 to become the circulating solution, the remainder being subjected to evaporation by means of which ammonium sulfate crystals are formed which are then filtered, washed and dried to produce a commercially useful crystalline ammonium sulfate.

The circulating ammonium sulfate solution is passed via line 11 to mixer 13, wherein it is contacted with nitrogen bases admitted through line 14 from nitrogen base storage tank 15. This mixture with nitrogen bases leaves mixer 13 via line 16 to settler 17 wherein two phases are formed, a lower aqueous salt phase which is returned via line 18 to line 12, and an upper phase consisting predominantly of the complex formed by the nitrogen bases and sticky material forming components, which passes via line 19 to reactor 20, wherein the complex is reacted with ammonia admitted through line 21. The ammonia displaces the nitrogen bases in reactor 20, which separate into two phases, one of which consists predominantly of the ammonia-sticky material compound (probably ammonium organic sulfate) which passes through line 22 to storage not shown, while the regenerated nitrogen bases pass from reactor 20 via line 23 to nitrogen base storage tank 15.

The recovered oil containing nitrogen bases withdrawn from reactor 4 via line 6 is admitted to extractor 24 wherein it is countercurrently contacted with sulfuric acid admitted to extractor 24 via line 25 from storage tank 26 equipped with supply line 27. The nitrogen bases are extracted by the sulfuric acid, forming a raffinate oil phase substantially free from nitrogen bases which passes from extractor 24 through line 28 to storage not shown. A sulfuric acid extract containing the nitrogen bases passes from extractor 24 through line 29 to nitrogen base reactor 30 wherein it is contacted with anhydrous ammonia admitted through line 31. The ammonia displaces the nitrogen bases, forming ammonium sulfate with the sulfuric acid, which passes from reactor 30 to filtration and evaporation unit 8 via lines 32 and 7. The nitrogen bases liberated in reactor 30 pass via lines 33 and 23 to nitrogen base storage tank 15. Makeup quantities of nitrogen bases can be admitted to nitrogen base storage tank 15 through line 34.

For purposes of clarity pumps, heat exchangers, bypasses, valves, vents and other auxiliary equipment have been omitted.

Although this invention is illustrated with reference to the production of ammonium sulfate, it is not limited thereto but may be equally well applied to the production of sodium sulfate, calcium sulfate, etc., from waste acid sludges, with all of its attendant advantages.

The amount of sticky material that can be removed from the circulating solution per pound of nitrogen bases depends upon the concentration of the sticky material in the solution and therefore will obviously vary with the types of sludge utilized. In general, it has been found that for optimum results the amount of nitrogen bases reacted with circulating solution in mixer 13 should be maintained at a point not less than 10 grams per liter and preferably in the neighborhood of 50 grams per liter. Under these circumstances equilibrium relationships seem to be most favorable for optimum removal of sticky material. For example, by this process it is easily possible to reduce the sticky material content of the dry salt to a quantity not greater than 2 grams per kilogram when employed in the continuous process of neutralizing waste sulfuric acid sludge with ammonia, as for example in the processes disclosed in U. S. Patents 2,026,250 and 2,022,813. The salt thus produced is substantially white in color and non-caking. While this process can be readily applied batchwise, it is preferably carried out in a continuous manner following the general system illustrated in the drawing. When preparing ammonium sulfate from typical sludges it has been found that about 1% by volume of nitrogen bases are sufficient to react with the sticky material present in the circulating solution. Of this quantity of nitrogen bases about 30% remains dissolved in the aqueous ammonium sulfate solution formed but it can be readily recovered as shown in the drawing or in a batch process. In the continuous process it has been found satisfactory to divert about 25% of the circulating solution for treatment (using about 4% by volume of nitrogen bases in mixer 13), although quantities deviating substantially from this volume may be successfully used.

The amount of nitrogen bases required for a given sludge being a function of the sticky material content of the sludge as well as its nitrogen base content, other things being equal it follows that a sludge containing a larger quantity of nitrogen bases requires a smaller auxiliary amount of nitrogen bases for treatment.

While it is possible to use pure nitrogen bases such as pyridine or quinoline, it is preferable to employ petroleum or coal tar nitrogen bases because of their ready availability and low cost. Nitrogen bases such as are obtained in the extraction process disclosed in U. S. Patent 1,411,237, for example, will be found satisfactory for use in the process described above.

We claim as our invention:

1. The continuous process wherein acid sludge derived from the acid treatment of petroleum hydrocarbons is contacted in a reaction zone with a base having a cation selected from the group consisting of potassium, sodium, calcium and ammonia, said acid sludge being characterized by the presence of organic contaminants normally forming a sticky coating on the reaction product of said acid sludge and said base, to form an aqueous sulfate solution containing at least a portion of said organic contaminants and an oil phase, including the steps comprising separating said oil phase and said aqueous sulfate solution in a separating zone, recirculating said aqueous sulfate solution to said reaction zone, continuously withdrawing a portion of said recirculating solution from the recirculating system, reacting a portion of the remainder of said recirculating solution in a reaction zone with a nitrogen base to produce a purified aqueous sulfate solution substantially free from sticky material producing compounds and a nitrogen base-organic contaminant complex, separating said purified aqueous sulfate solution from said nitrogen base containing complex and returning said purified aqueous sulfate solution to the recirculation system, reacting said nitrogen base-organic contaminant complex with ammonia in a reaction zone to form a nitrogen base substantially free of organic contaminants and an ammonia-organic contaminant compound, separating said nitrogen base and said ammonia-organic contaminant compound and thereafter returning said recovered nitrogen base to said penultimately mentioned reaction zone.

2. In a continuous process wherein acid sludge derived from the acid treatment of petroleum hydrocarbons is reacted with a base having a cation selected from the group consisting of potassium, sodium, calcium and ammonia, said acid sludge being characterized by the presence of organic contaminants normally forming a sticky coating on the reaction product of said acid sludge and said base, to form an aqueous sulfate solution containing a portion of said organic contaminant, the steps comprising reacting at least a portion of said aqueous sulfate solution with an organic nitrogen base in a reaction zone to produce an organic complex containing said sticky material producing contaminants and a purified aqueous sulfate solution substantially free from sticky material producing compounds, separating said complex from the purified solution, adding ammonia to the separated complex whereby nitrogen bases are liberated, separating and recovering the liberated nitrogen bases and returning them to said reaction zone.

JAN D. RUYS.
RUSSELL L. KITTLE.
FRANK W. HEATH.
WILLIAM H. DIETZ.